United States Patent [19]

Sherman

[11] Patent Number: 5,085,753
[45] Date of Patent: Feb. 4, 1992

[54] WATER PURIFIER

[75] Inventor: Mark Sherman, St. Louis, Mo.

[73] Assignee: Floatron, Inc., St. Louis, Mo.

[21] Appl. No.: 510,104

[22] Filed: Apr. 17, 1990

Related U.S. Application Data

[63] Continuation of Ser. No. 301,177, Feb. 21, 1989, abandoned.

[51] Int. Cl.$^5$ .................... C25B 9/00; C25B 15/08
[52] U.S. Cl. .................... 204/267; 204/271; 204/272; 204/286; 204/292; 204/293
[58] Field of Search .............. 204/271, 272, 275–278, 204/292, 293

[56] References Cited

U.S. PATENT DOCUMENTS

| | | | |
|---|---|---|---|
| 3,222,269 | 12/1965 | Stanton | 204/278 X |
| 4,337,136 | 6/1982 | Dahlgren | 204/242 |
| 4,352,722 | 10/1982 | Ohkawa | 204/278 X |
| 4,525,253 | 6/1985 | Hayes et al. | 204/275 X |
| 4,525,272 | 6/1985 | Henson | 204/272 X |
| 4,769,119 | 9/1988 | Grundler | 204/228 X |

FOREIGN PATENT DOCUMENTS 8601543 3/1986 World Int. Prop. O. .......... 204/271

Primary Examiner—Donald R. Valentine
Attorney, Agent, or Firm—Polster, Polster and Lucchesi

[57] ABSTRACT

A water purifier has a buoyant housing for supporting a purification cell below the water's surface and for supporting a solar cell array for providing power for the purification cell. The purification cell preferably has a solid cylindrical anode and a coiled wire cathode. The water purification cell operation includes electrolytic processes, electrocution and oxidation to destroy bacteria and algae in the water.

15 Claims, 2 Drawing Sheets

WATER PURIFIER

BACKGROUND OF THE INVENTION

The present invention relates in general to a self-contained, portable water purification device, more particularly, to a completely self-contained, integrated, and portable water purifier incorporating an electrolytic purification cell placed within a housing and further providing for water transportation through and in operative contact with the purification cell. The purification device of this invention is an improvement over conventional water purification devices and methods.

It is known to use chlorine as a sanitation agent, however, chlorine is neither an efficient, healthful, nor a particularly economical sanitation agent. Furthermore, due to the continuing popularity of swimming pools, spas and hot tubs, there is an increasing public awareness of the dangers of handling, storing and using chlorine for water sanitation.

It is known that metallic ions kill or control algae and bacteria. It is also known that copper ions kill or otherwise prevent the growth of algae and that silver ions kill bacteria, especially e. coli. It is further known that zinc, aluminum, and gold ions, to name just a few can be used for the same or similar purposes.

Conventional devices and methods have generally been uneconomical and inefficient in utilizing metallic ions. The known conventional devices have generally concentrated on controlling and regulating a DC current and its associated waveform from an 120 V or a 220 V AC power source in order to produce the desired results. The resulting equipment is expensive and complicated and generally requires special installation and adjustments, thereby further increasing both manufacturing and operating costs.

Further drawbacks in the conventional devices include a problem of safely using low voltage DC electrical currents regulated and controlled from 120 V AC and 220 V AC sources, in particular, water that is in contact with swimmers. Conforming conventional devices of this type to the necessarily strictest safety requirements further increases manufacturing and liability insurance costs.

Conventional purification devices recognize various bacteria and algae killing or controlling mechanisms and methods occurring in various purification cells. These conventional devices utilize, for example, an excess of anodic reaction products, a particular linear relationship between purification cell current and treated water temperature, adding sodium persulfate to water in which copper and silver ions have been added from copper-silver electrodes immersed in the water, or by adding salt in sufficient quantities to make the water slightly conductive and then circulating the slightly conductive water through an electric field between a pair of electrode plates. However, none of the known conventional devices have identified important and useful parameters effecting the electrical destruction of microorganisms as revealed by the present invention.

Other drawbacks of the known conventional devices appear to result from the use of low voltages, for example voltages ranging from 1 volt to 6 volts, either AC or DC. At least some of these drawbacks are apparently due to problems associated with a purification cell, such as excessive gassing, corrosion, and accumulation of scale and deposits at the purification cell electrodes. The result can be reduced efficiency, destruction of the purification cell or the necessity of repetitive cleaning of the purification cell electrodes. Many of these problems could probably be overcome, for example, by lowering the voltage potential, but at the expense of purification cell efficiency, such as longer contact time or purification cell retention time for the water to be treated.

Accordingly, it is an object of the present invention to provide an improved water purification cell that is capable of removing the amount and types of waterborne bacteria and airborne micro-organisms.

Another object of the present invention is to provide an improved water purification device to purify water for pools, spas, hot tubs, lakes, ponds, and marshes without the need to add additional chemical disinfectants to the water.

A further object of the present invention is to provide a water purification device to substantially eliminate or reduce the need for complicated circuits and hardware, and unnecessary equipment.

Still another object of the present invention is to provide a water purification device employing a cell that will produce a multitude of processes found to have effective and efficient germ killing mechanisms. This is intended to overcome the capability of many bacteria to develop resistances to singular methods of disinfection.

Still a further object of the present invention is to provide a water purification device that employs a cell that can utilize a relatively high voltage, relatively large surface area and relatively low flow rates to produce an effective and efficient purification cell that can also kill germs by an electro-destructive process.

Another object of the present invention is to provide a water purification device to eliminate the problems associated with purification cells that typically convert high input voltage to relatively low voltage, e.g., six volts, namely cleaning, gassing, corrosion, and safety.

A further object of the present invention is to provide a water purification device that addresses the drawbacks of the conventional devices, which have focused primarily on components of the conventional devices, whereas the present invention approaches the solution by providing a novel and unique approach to the entire purification apparatus and process.

Yet another object of the present invention is to provide a water purification device that does not require transporting or causing movement either through a stationary purification cell or within the confines of the cell housing. The present invention provides a purification cell that is buoyantly transported using natural currents to induce motion and flow.

SUMMARY OF THE INVENTION

To accomplish the foregoing and other objects of this invention there is provided a self-contained water purification device particularly for disinfecting water. The water purifier comprises housing means buoyantly supporting the device of the present invention. Purification means electrolytically purify a quantity of water while buoyantly supported by the housing. Water transportation is effected through and to the purification means. Power is provided for the purification means, in a preferred embodiment a solar panel provides the power source.

The water purification device may employ a housing or body, preferably circular, that is made so as to be buoyant when placed in water. The water purifier is free to float and move about on the surface of the water. Alternatively, the water purifier may be tethered and fixed so as not to move. The buoyant or floating housing can support all of the parts required by the device. The housing preferably supports from above in order to hold and maintain the electrolytic cell below the surface of the water being treated. A guard or cage can be provided which surrounds the purification cell in order to reduce the likelihood of damage to the electrolytic purification cell.

These and other objects and features of the present invention will be better understood and appreciated from the following detailed description of embodiments thereof, selected for purposes of illustration and shown in the accompanying drawings.

DETAILED DESCRIPTION

Figure 1:
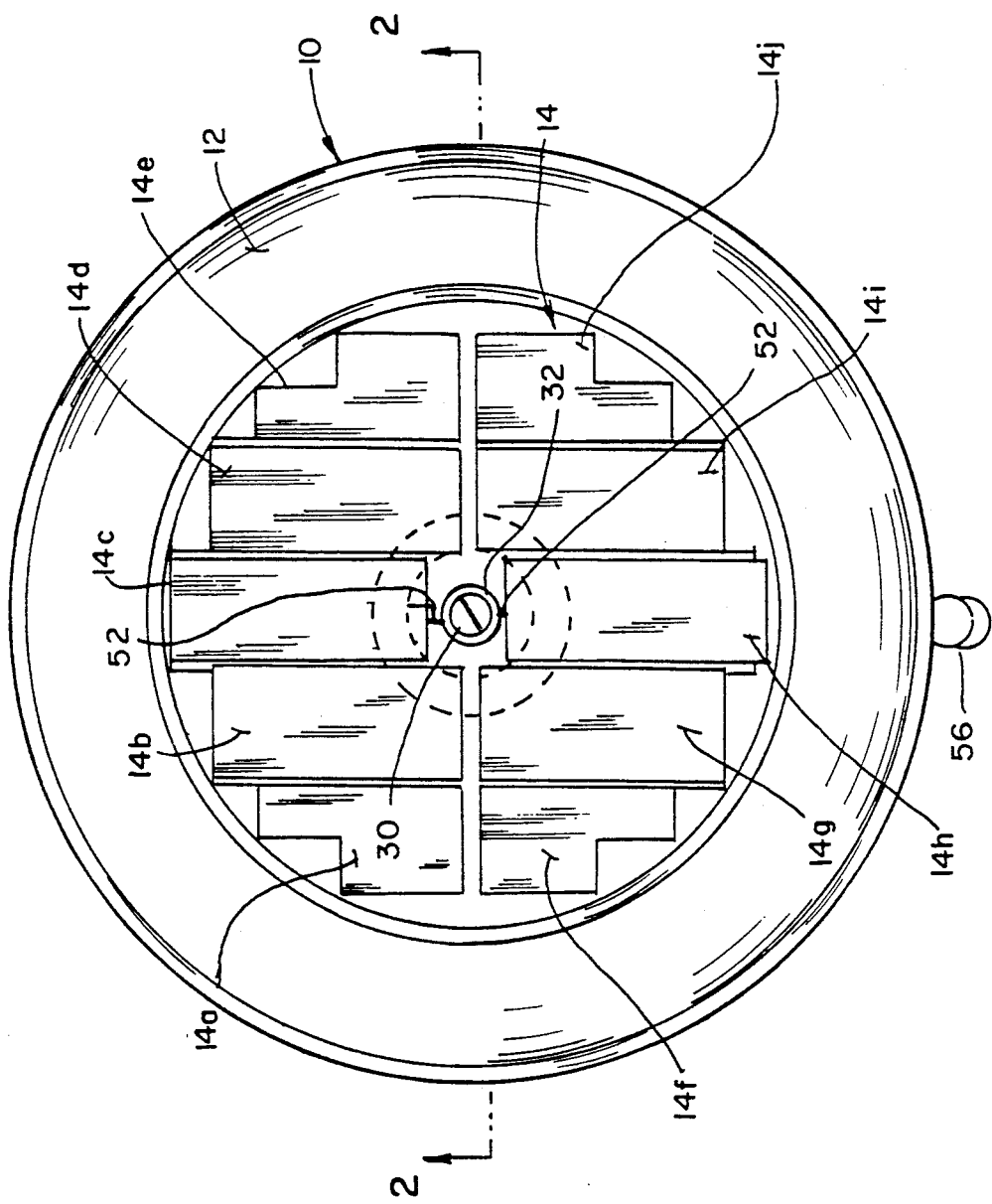
FIG. 1 is a plan view of one of a preferred embodiment of the present invention.

Referring now to the drawings there is shown a preferred embodiment for the water purification cell of this invention. The water purification cell is particularly adapted for providing water purification for a volume of water in which the buoyant housing floats in response to currents and wind. Tethering the purifier of the present invention provides localized purification as water currents move water volumes into operative association with the cell. Solar powered purification cells in a preferred embodiment increase the overall applicability of the present invention.

The drawings show the water purifier 10 in conjunction with a buoyant embodiment that comprises a buoyant or floating housing means such as a floating housing 12 supporting a solar power means which in a preferred embodiment includes a plurality of solar photovoltaic cells 14. It will be understood that a suitable solar array assembly can provide the necessary power for the water purifier electrolytic cell of the present invention. A guard means such as purification cell guard 16 removably attaches to housing 12. The device 10 further includes a plurality of electrodes such as an anode means and a cathode means together providing primary electrolytic cell components. In a preferred embodiment anode means consists of a sacrificial anode 18 and cathode 20 means consists of a spirally wound wire cathode 20.

A preferred solar array 14 consists of solar photovoltaic cells 14a through 14j connected electrically to each other so as to produce a desired output voltage and amperage in a manner understood by one knowledgeable in the operation of solar cells.

Figure 2:
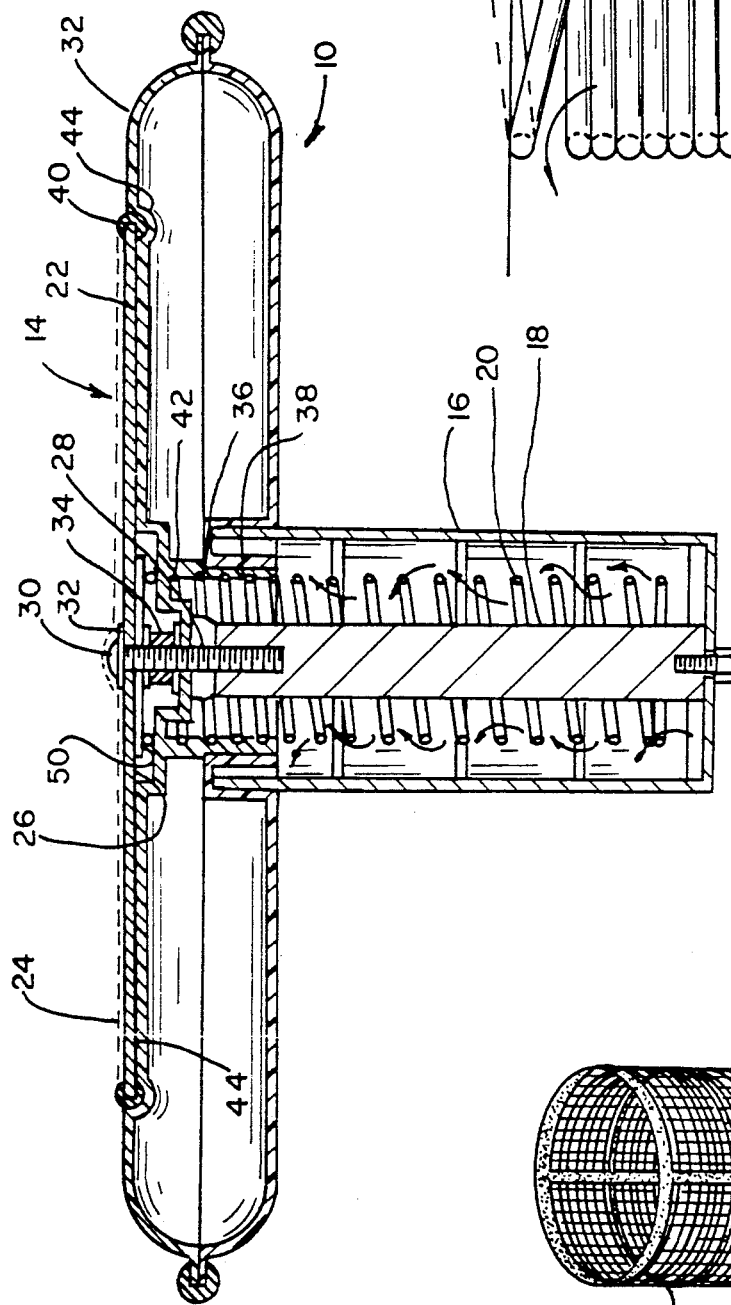
FIG. 2 is a cross sectional view taken along line 2—2 of FIG. 1.

The solar array 14 is secured to a suitable substrate 22, which in a preferred embodiment is an aluminum plate as illustrated in the drawings. It will be understood that an aluminum panel could provide the required board. A protective coating 24 is applied over the finished solar array assembly 14, fasteners and terminals as illustrated in FIG. 2 and as further described. In a preferred embodiment a copper clad surface coats the undersurface 26 of the substrate 22.

An aperture 28 is provided in buoyant housing 12 and receives an electrically conductive threaded bolt 30. The bolt 30 in cooperation with a lock nut 34 conductively secures a copper clad washer 32 to the substrate 22. A rubber washer 36 seals electrical connections on substrate undersurface 26 since the seal prevents water from entering between the anode 18 and the housing aperture 28. The anode 18 defines a threaded bore 38 for threadably receiving the bolt 30. A sealing means such as an edge gasket 40 is held in a sealing receiving means, such as a groove or channel 44 formed in or otherwise defined by housing 12. In a preferred embodiment of the present invention clockwise rotation of anode 18, tightens, seals, and fastens the solar array assembly 14 and the anode 18 within the housing aperture 28. Counter clockwise rotation allows the sacrificial anode 18 to be removed and replaced.

The undersurface 26 of the aluminum plate includes a conductive ring 50 attached thereto as illustrated in the drawings. The solar array assembly 14 contains a positive output terminal 52 and a negative output terminal 54. The positive output terminal 52 is conductively attached to an electrically conductive washer such as copper washer 32. In a preferred embodiment the positive output terminal 52 is soldered to the washer 32.

A conductive means on the underside surface 26 provides a conductive path from the solar cell array assembly 14 to the cathode means. In a preferred embodiment a conductive annular ring 50 is electrically connected to the negative output terminal 54 of the solar array assembly 14. As illustrated in FIG. 2, a cathode means upper portion such as an upper coil portion 42 of the spirally wound wire cathode 20 conductively contacts the conductive ring 50 and provides for an electric current to pass from the solar array assembly 14 to the spiral wound cathode 20. The cathode 20 is preferably embedded in the buoyant material of housing 12, as illustrated, and in a preferred embodiment the buoyant material is plastic such as ABS, polypropylene or polyethylene.

As previously described, the anode 18 includes the threaded bore 38 at one end to accept the threaded bolt 30. Bolt 30 and washer 32 form a first conductive path between the solar array assembly 14 and the anode 18. Conductive annular ring 50 provides a second conductive path between the solar array assembly 14 and cathode 20.

The anode 18 consists of an electrically conductive elemental metal or transition metal including, but not limited to copper, silver, gold, platinum, zinc, aluminum, and titanium. A prototype of anode 18 was prepared from a metallic alloy. The prototype anode composition was essentially 97% copper and 3% silver. Other percentages, other alloys and other conductive materials could be used for anode 18. For example, anode 18 could also consist of alloys further containing gold, platinum, zinc, aluminum, and titanium or other suitable transition metals.

A prototype of electrolytic purification cell of the present invention consists of an anode 18 of copper-silver alloy. The cathode 20 consists of an electrically conductive metal from a group including galvanized iron wire, or stainless steel wire, or titanium wire spirally wrapped around and encompassing the solid cylindrical shaped anode 18 such that water can flow between and around the anode and cathode 20 and also through the cathode coils.

The purification cell guard 16 includes a basket member attached to the electrode in a preferred embodiment as illustrated in the drawing figures.

In a preferred embodiment, the solar generating array or panel 14 communicates electric current directly to the cathode and anode by means of terminals 52 and 54 conductively connected with the panel substrate 22 and the voltage output of solar cell array 14. The solar panel 14 is suitably protected from the elements to provide lasting service. Both the solar panel 14 and the electrolytic cell are sized and configured to provide a desired rate of purification.

When the device is placed and floated on the water such that it is available to receive solar radiation, an electrical current will pass through the cell and produce the purification processes. The purification process includes the ionization of metallic ions which in a preferred embodiment are copper and silver ions but could include other transition metals, such as, zinc, aluminum, gold, platinum and titanium. The process of the present invention also employs oxidation, whereby electrons are abstracted and oxygen is added, a plating out and removal of calcium, and an electrocution process whereby germs are killed when contact is made with the electrodes.

The device provides a geometrically shaped cell, employing a spiral wound wire cathode 20 similar to a coiled spring and which produces several new and useful features, around a center solid cylindrical anode 18. One important feature is the natural induced flow of the water through and around the coils of cathodic wire coiled spring arrangement which has a significantly large surface area per length and volume, and produces a sufficient contact time for electro-destruction of microorganisms. Another important feature is due to the spring effect which enables effective and easy manual cleaning of the scale which accumulates on the cathode 20.

The device is normally allowed to float freely and unrestricted, moving about very slowly by gentle natural currents or currents typically induced by pumping equipment associated with the location in which the device is placed. After an initial accumulation and purification period lasting about 10-14 days, with full sun, the device can be removed and floated periodically two or three days a week depending on use and weather conditions, or the device can routinely be used for short periods daily. When removed from its environment, the purification device ceases operation and halts the purification process instantly because no electrolytic medium contact remains.

Figure 4:
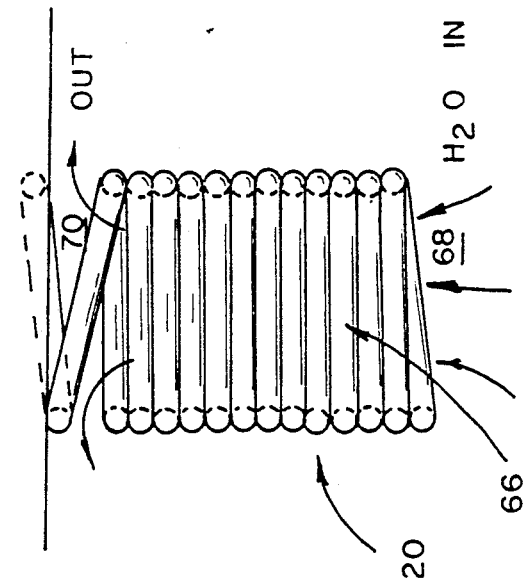
FIG. 4 illustrates an embodiment of a cathode of the present invention.
Figure 3:
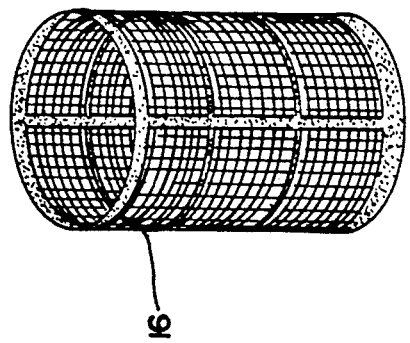
FIG. 3 is an elevation of a basket used in one preferred embodiment.

FIG. 4 is another style of a cathode 20 wire shape which effectively produces a closed type of cell and a purification channel 66, whereby water enters at the one bottom opening 68 of the channel 66 and exits at another opening 70 at the top of the channel. The closed cell or channel is typically employed in situations where the current would cause the flow rate through the cell coil openings to be excessively high.

It has been determined that in a preferred embodiment of the present invention for purification of swimming pools containing up to 15,000 gallons, a housing 12 would be approximately 9 to 12 inches in diameter and approximately 2 inches thick in section. The purification cell for such an application would further include a solar array assembly 14 capable of producing an open voltage from approximately 15 volts to approximately 18 volts and a full load current of approximately 100 ma at optimum solar conditions.

In this preferred embodiment the anode 18 comprises an alloy of copper and silver. The anode nominal dimensions are approximately 1 inch in circumference and 3 inches in length. In this preferred embodiment a cathode 20 is constructed from 0.1 or 0.125 inch diameter spring wire of either stainless steel or galvanized wire materials, and wound to an outside diameter of approximately 1.5-2.0 inches such that the coils are spaced from approximately 0.125 to approximately 0.5 inches apart.

EXAMPLE I

It has been found that the water purifier 10 previously described, placed in a pool of approximately 12,000 gallons effectively purifies the water. It was determined that the copper and silver ionization level reached between approximately 0.1 and approximately 0.20 PPM copper and approximately 20 to approximately 40 PPB silver after an initial period of 10 to 14 days of use, depending on weather conditions. After this initial period, further observation revealed that it is only necessary to periodically float the device a few hours per day or 2 to 3 days a week to reach and maintain a desired concentration of copper ions at a level of from approximately 0.15 PPM to approximately 0.30 PPM.

The test indicated that the described prototype of the present invention, when placed in a pool with an existing circulating pump and filtration system operating, that the device will gently and slowly circulate around and about the pool carried by the circulation currents of the pool.

Chlorine or other chemical disinfectant use is significantly diminished or no longer required upon attaining a desired ionization level. Further use of chemicals will depend upon frequency of use of the device, weather conditions, use of the water and other commonly recognized variables.

It has been further observed that after several weeks of continuous operation, calcium accumulation on the spring cathode 20 may reduce efficiency and the calcium accumulation should be removed. A key feature of the spring cathode 20 relates to the ease of cleaning. Simply remove the cell guard 16 and flex the spring, thereby causing a torsional force on the wire which easily removes the calcium buildup from the cathode 20.

Based on the tests performed, it is believed that after several years of operation the anode 18 will be sacrificed or expended, thereby leaving a stubby piece attached to the conductive bolt 30. Replacing the expended anode 18 merely requires unscrewing the anode 18 remains and threading a new anode 18 in position. It will be understood that while a threaded connection 38 is preferred, other equivalent conductive connection means for attaching the anode 18 to the power source may be used.

The present invention is not limited to treatment of a particular volume of water. In another preferred embodiment for pool sizes up to 40,000 gallons it is anticipated that a solar output of approximately 260 ma and from approximately 15 volts to approximately 18 volts should provide the desired purification. It is anticipated that the circular housing 12 would have a diameter of approximately 12 inches. The anode 18 and cathode 20 length would increase to an overall length of between approximately 4½ inches to approximately 5 inches and a circumference of approximately 1 inch.

It will be understood that although the preferred embodiments have been employed for the specific use of swimming pools, the device could be down sized to accommodate smaller volumes of water such as hot tubs and spas.

It will be understood that the present invention is also useful for lagoons, marshes, lakes, rivers, ponds, or other large bodies of water that are overloaded with bacteria or algae. Use of the present invention would be particularly advantageous since, in many instances, there is no existing filtration system, circulation pumps or related plumbing and transport systems, not to mention the lack of available power.

In the preferred embodiments describe heretofore the aluminum panel supports the solar array substrate 22. The conductive annular ring 50 provides a terminal connection between the cathode upper portion 42 and the solar cell array 14. The ring 50 is preferably attached to aluminum panel undersurface with a suitable adhesive. In a preferred embodiment the ring 50 comprises an etched printed circuit board wherein the etched surface provides the conductive surface.

Research conducted on several flow-past and flow-through electrolytic cells employing flat plate electrodes revealed that the kill rates of micro-organisms increased approximately linearly with power, and that voltage had a greater impact than current even at equal power levels. Also revealed was the requirement for the micro-organism to approach or contact the electrodes to be destroyed, thus reinforcing the importance of surface area to the purification cell effectiveness.

Results of these tests on the cells further revealed that cell contact time was important and a function of the combination of voltage, surface area, and volumetric flow rate through a single pass purification cell. In general, it was observed that using voltage levels of 2−v and a large contact time resulted in extremely low flow rates through the purification cell. The conclusion could then be drawn that for effective disinfection the volumetric flow rates needed to be much lower than commonly used in conjunction with swimming pool or spa pump equipment. The test results further indicate that the contact time can be reduced, thus increasing the flow throughout the purification cell, by increasing the voltage and without a corresponding increase in power.

When these parameters, i.e., voltage, surface area, flow rate, are properly employed in an electrolytic purification cell of the present invention they are effective in killing *E. Coli, Psuedonomas aerogenous, Klebsiella pneumonic,* and *Bacillus subtillas.*

The purification cell of the present invention in a preferred embodiment provides a cathode 20 in the form of a coiled spring. The cylindrical shaped anode 18 is intended to be encompassed by the coiled spring cathode 20. The present invention thereby provides several new and useful features for a high voltage electrolytic purification cell. The wound wire permits a maximum use of the surface area per unit length of the wire and per unit volume of the purification cell formed by the combination of the cathode 20 and anode 18.

Changing the coil spacing of the cathode 20 between the each coil or loop of wire, effectively changes the cell to an open type cell whereby the water has no fixed inlet or outlet. As previously described, closely winding the coils forms a closed cell or purification channel 66, whereby the water enters at one end and exits at the another end. When the electrolytic cell oriented vertically and a voltage of greater than 6 v is used, a natural flow of the water is induced upward and around the coils producing a natural low volumetric flow rate through the cell and relatively high contact times, both of which are desirable.

Intermediate spacing of the coils provides another embodiment having a combination of the open cell and a closed cell. The combination purification cell permits water to flow radially and axially throughout the purification cell depending upon the relative velocity of the purification cell with respect to the water.

It may be determined by one skilled in the art, based upon the disclosure herein, that a particular coil spacing may provide a closed type of cell whereby water enters at the bottom of the cathode coil 20 and exits at the top open portion of the cathode coil 20. A closed cathode coil 20 is employed in situations where the water currents cause a volumetric flow rate through the cathode coil 20 to be excessively high and thereby according to the teachings herein less effective than the lower volumetric flow rate.

It will now be better understood that spring steel wire allows a compression or expansion of the coiled electrode (cathode 20). The compression or expansion produces a rotational movement of the wire, thereby causing a torsional force to be applied to any scale or deposits that accumulate on the cathode 20. This torsional force tends to loosen the scale or deposit which can then be readily and easily removed from the cathode 20. Thus, a manual electrode cleaning method is also advantageously provided by the coiled spring style electrode.

While specific embodiments have been shown and described, many variations are possible. As previously described, the device floats on the water surface and in its uncontrolled motion is expected to navigate the body of water into which it is placed. There it can freely float and move about on the surface of water. Alternatively, the device can be tethered so as not to move. The tether means can consist of harness means or, as shown in the drawings for the purpose of illustration, the tether means could include an eye 56 for receiving a rope, stay, strut or the like. Another variation includes a housing having a upward facing depression for receiving at least one solar cell and a protective coating including an epoxy coating or similar material poured over the solar cell after providing for the necessary conductive connections. The improved water purification device provides for improved water purification without the need for chemical amendment to the water being treated. The device is simple and utilizes the simplest, most prevalent source of power in a preferred embodiment, solar power. (Although, it will be understood that other embodiments of the invention can be powered by other sources of power as circumstances dictate.) The present invention utilizes more than one process to purify the water and includes a novel cathode design that provides water flow through, dimensional variation and easy cleaning.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A water purifier comprising:
   a buoyant housing;
   a solar photovoltaic cell supported by the housing;
   a plurality of electrodes, including an anode and a cathode, wherein the cathode is a spiral wound wire generally supported by the housing and the anode is substantially enclosed by the cathode and the anode is generally supported by the device;
   a suitable substrate supports the solar cell, the substrate including means for providing suitable conductive connections between the solar cell and an anode conductive connection and a cathode conductive connection, including a conductive ring on the substrate undersurface; and
   an aperture defined by the buoyant housing and receiving a conductive bolt to which the anode is removably attached, the conductive bolt conductively connected to the solar cell.

2. A water purifier as set forth in claim 1, including a guard for the purification cell.

3. A water purifier as set forth in claim 2, wherein the guard is removably attached to the device.

4. A water purifier as set forth in claim 1, wherein the substrate is a suitably coated aluminum panel.

5. A portable self-contained solar powered water purifier comprising:
   housing means for buoyantly supporting the purifier;
   solar cell means supported by the housing means above water to be treated;
   purification means depending from the housing means so as to be positioned in water to be treated;
   means for electrically connecting the solar cell means to the purification means to purify water when the purifier is placed therein; and
   said housing means being constructed for balanced buoyancy relative to said solar cell means and said purification means to continuously maintain said solar cell means above water to be treated while said purification means is buoyantly supported and positioned in water to be treated.

6. A portable self-contained solar powered water purifier comprising:
   a disc-shaped housing means for buoyantly supporting the purifier, said disc-shaped housing means having a width substantially greater than the height thereof;
   solar cell means extending across and supported relative to an upper surface of said housing means;
   purification means depending from the disc-shaped housing means so as to be positioned in water to be treated, said purification means depending from a central area of said disc-shaped housing means in substantially equidistantly spaced position relative to an outer circumferential margin of said disc-shaped housing means; and
   means for electrically connecting the solar cell means to the purification means to purify water when the purifier is placed therein.

7. A portable self-contained solar powered water purifier comprising:
   housing means for buoyantly supporting the purifier;
   solar cell means extending across and supported relative to an upper surface of said housing means;
   purification means depending from the housing means so as to be positioned in water to be treated;
   means for electrically connecting the solar cell means to the purification means to purify water when the purifier is placed therein;
   said purification means depending from a central area of said housing means in substantially equidistantly spaced position relative to an outer margin of said housing means; and
   said housing means having a width substantially greater than the height thereof for balanced buoyancy of said housing means relative to said aforementioned associated components supported thereby.

8. A water purifier as set forth in claim 7 wherein the purification means comprises: sacrificial anode means for providing ionized metallic ions for purifying the water; and cathode means for providing a plating surface.

9. A water purifier as set forth in claim 8 wherein the purification means comprises a cathode means for removing calcium and magnesium salts from the water.

10. A water purifier as set forth in claim 8 wherein the cathode means comprises a spirally wound electrically conductive cathode.

11. A water purifier as set forth in claim 8 wherein the anode means comprises a solid cylinder.

12. A water purifier as set forth in claim 8 wherein the sacrificial anode means comprises an electrically conductive material.

13. A water purifier as set forth in claim 12 wherein the sacrificial anode is an elemental metal.

14. A water purifier as set forth in claim 12 wherein the sacrificial anode is an alloy providing an ion suitable for purification during an ionization mechanism.

15. A water purifier as set forth in claim 12 wherein the sacrificial anode consists of an electrically conductive, suitable metal with microorganism destructive capacity.

* * * * *